Oct. 1, 1929.   J. H. HAMMOND, JR   1,730,138
LUBRIMETER
Original Filed Dec. 16, 1922   2 Sheets-Sheet 1

INVENTOR
BY John Hays Hammond Jr.
A. J. Gardner
HIS ATTORNEY

Oct. 1, 1929.    J. H. HAMMOND, JR    1,730,138
LUBRIMETER
Original Filed Dec. 16, 1922    2 Sheets-Sheet 2

INVENTOR
BY John Hays Hammond Jr.
A. S. Gardner
HIS ATTORNEY

Patented Oct. 1, 1929

1,730,138

UNITED STATES PATENT OFFICE

JOHN HAYS HAMMOND, JR., OF GLOUCESTER, MASSACHUSETTS

LUBRIMETER

Application filed December 16, 1922, Serial No. 607,264. Renewed February 27, 1929.

This invention relates to a lubrication indicator for motor driven machines, such as motor vehicles and the like.

Such vehicles and similar machinery require careful attention to proper lubrication of the moving parts. When such apparatus is maintained by a person who is not appreciative of the great importance of lubrication, and of the varying wear different parts thereof are subjected to or who is not warned of it, at least some of the parts are likely to be neglected.

It is one object of the present invention to provide an improved indicator for displaying a warning signal when lubrication of certain parts is required.

Another object is to provide for controlling the warning signal according to the extent of movement of the driving mechanism until displayed, and preventing further actuation of the signal until reset.

Other objects will appear from the following description taken in connection with the accompanying drawings, in which Figure 1 shows the instrument mounted on the dashboard of the machine and connected up to the speedometer gearing;

Figure 1:
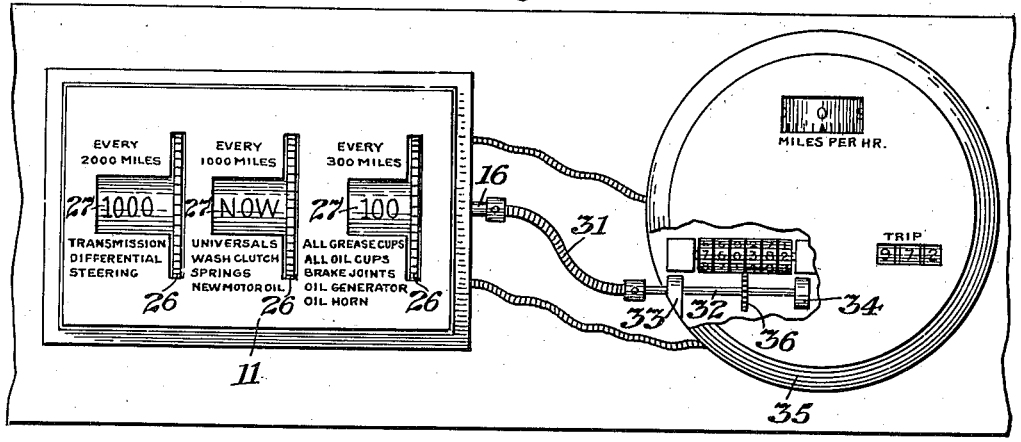
Figure 2:
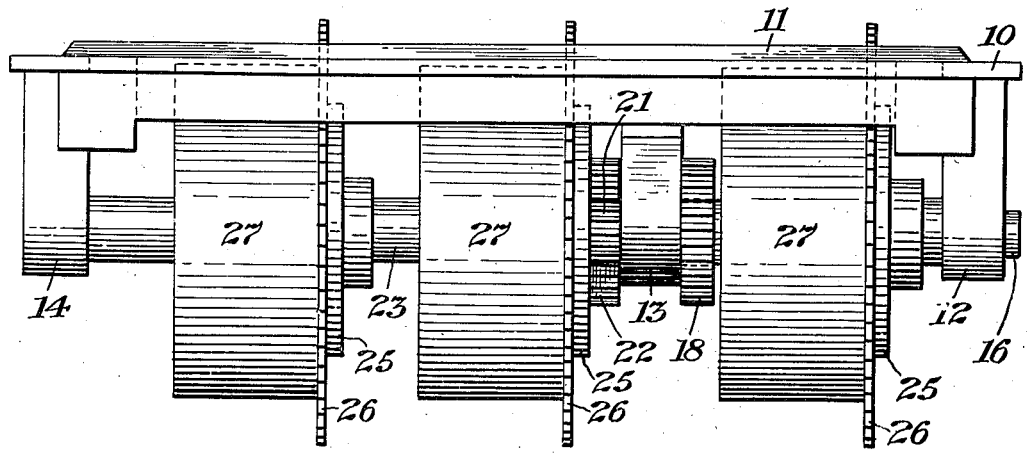
Figure 2 is a front elevation of the same.

Referring to the accompanying drawings, one embodiment of this invention comprises a frame 10 to the front of which is secured the face plate 11. This face plate is marked wtih the parts of the machine which need attention at various mileages. Rigidly secured to the frame 10 are three brackets 12, 13 and 14 which serve as shaft bearings. A shaft 16 is mounted to rotate freely in the bearings 12 and 13, and has rigidly secured thereto a pinion 17 which meshes with a gear 18, rigidly secured to a shaft 19 which has a bearing in the bracket 13. Rigidly secured to the other end of the shaft 19 is a pinion 21 meshing with a gear 22 which is rigidly secured to a shaft 23. This shaft is supported rotatably in the brackets 13 and 14.

Rigidly secured to the shafts 16 and 23 are collars 25. Loosely mounted upon the shafts are toothed discs 26 to which are riveted cupped members 27. Spring washers 28 are provided which press against the members 27 and which are held in position by collars 29 rigidly secured to the shafts 16 and 23. Carried by the frame 10 are three pins 30, which at suitable times co-operate with lugs 30' carried by the discs 26. The cupped members 27 are engraved with suitable numbers, and the words "Now" and "Danger" as shown in Fig. 1. Rigidly secured to the end of the shaft 16 (see Fig. 1) is a flexible shaft 31, the other end of which is rigidly secured to a shaft 32, which has bearings 33 and 34 in the speedometer 35. The shaft 32 carries a gear 36 which meshes with the odometer gearing of the speedometer.

In the operation of the form of the invention shown, the gear 36 is rotated intermittently by the odometer gearing, and thus serves to rotate the shaft 16. The shaft 16 turns at a desired rate of speed relative to the speed of the motor vehicle or other machine to which the device is applied, for example, it makes one revolution for every 400 miles traveled by the machine. The shaft 23 which is driven from the shaft 16 by means of the gearing 17 and 18, 21 and 22, rotates at such a speed that it makes one revolution in 2,666 miles; as the shaft 16 rotates, it carries with it the collar 25 which causes the toothed disc 26 and the cupped member 27 to be rotated with it, as these are pressed against it by the spring washer 28. The other cupped members 27 are rotated in a similar manner but at a slower speed, as previously described.

Figure 3:
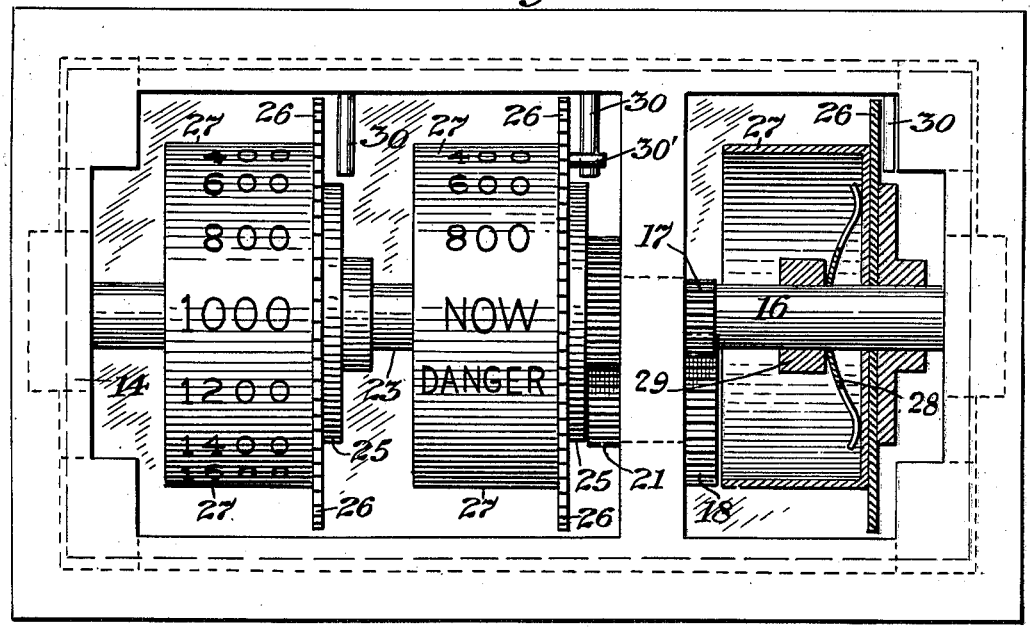
Figure 3 is a plan view of a mechanism partly in section constructed in accordance with this invention.
Figure 4:
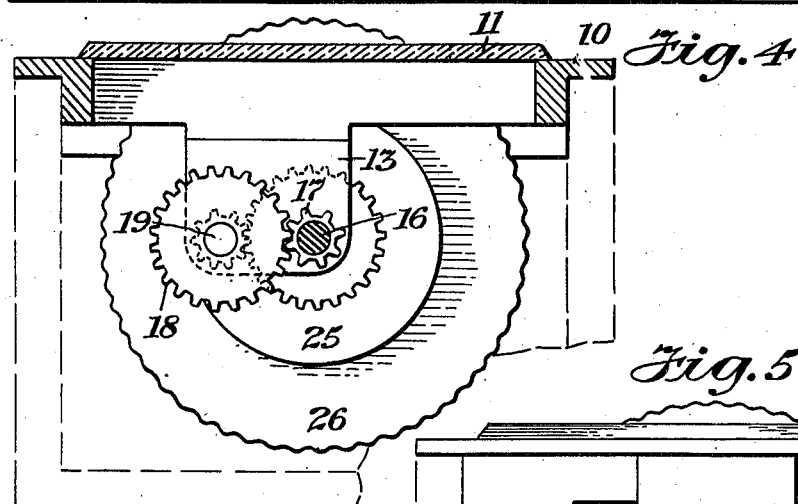
Figure 4 is a cross section on line 44.
Figure 5:
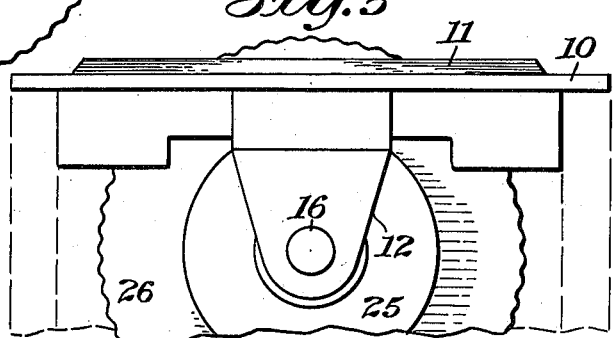
Figure 5 is a side view.

The cupped members 27 continue to rotate, and as they do, successively show figures through the openings in the face plate 11, thus indicating how many miles the machine has traveled since they were reset. After each one has turned through a given amount which corresponds to a predetermined distance, the word "Now" appears in the opening, thus indicating that the parts of the machine designated by the markings on the face plate adjacent to this opening, need attention at this time. If these members are not reset, they continue rotating until the word "Danger" appears in the opening. At this time lugs 30' carried by the discs 26 engage the pins 30, thus holding the members 27 so that the word "Danger" stays in the opening of the face plate 11, as the discs 26 and the members 27 slip with respect to the collars 25 and the spring washers 28. After the parts indicated have been attended to, the members 27 are re-set to their initial positions by rotating the toothed discs 26 by means of the finger, as the toothed periphery projects through the face plate, as shown in Fig. 3.

The invention upon which this application is based is broader than the specific embodiments shown and described for the purposes of illustrating some of the ways in which it may be employed. The scope of the invention is therefore understood not to be limited by the present specific description. I intend no limitations other than those imposed by the appended claims.

What I claim is:—

1. In an indicating device for a motor driven machine, a movable indicator for indicating the extent of movement of the machine, said indicator being provided with a plurality of members, each having indicia showing the requirements of the machine with regard to lubrication, means for setting predetermined ones of said members so that said indicia are in visible position after a predetermined extent of movement of the machine, and stoppage means for preventing further movement of said indicia beyond such position.

2. In an indicating instrument, a graduated rotary member for indicating the extent of movement of a mechanism, said member having a signal arranged to be displayed after a predetermined extent of movement of the mechanism and means for preventing subsequent movement of said rotary member after said signal has been displayed.

3. In an indicating instrument, a rotary member, means for operatively connecting said member with a movable mechanism for driving said member from said mechanism, said member having a plurality of variously characterized indicia for indicating the extent of movement of the mechanism, and means for preventing further movement of said member when indicia of one character become displayed, said last named means being ineffective while indicia of a different character are displayed.

In testimony whereof I hereunto affix my signature.

JOHN HAYS HAMMOND, Jr.